Oct. 11, 1927.  1,644,998

R. W. GUNN ET AL

STANDING VALVE CONNECTION

Filed March 13, 1926   3 Sheets-Sheet 1

Inventors
Robert W. Gunn.
Willsie A. S. Thompson.

Attorney.

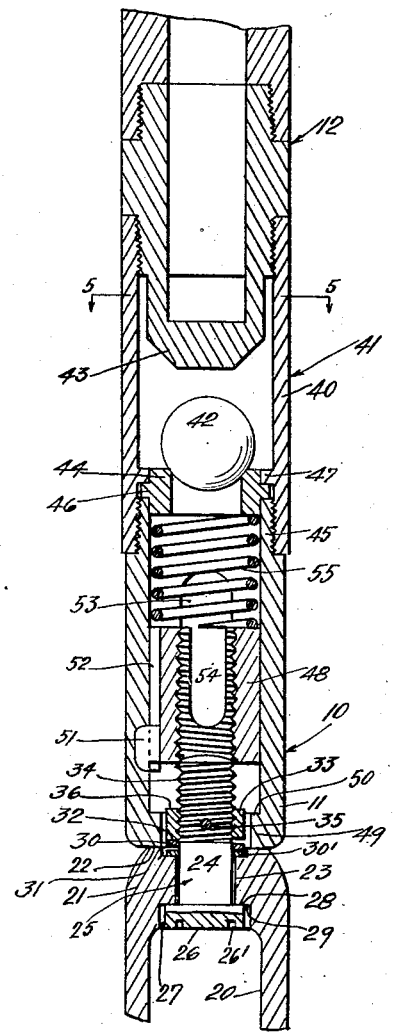

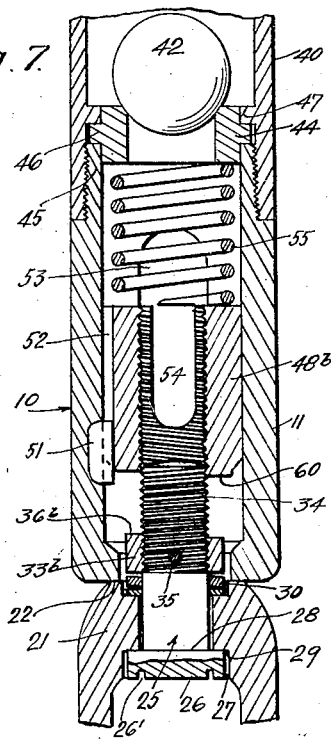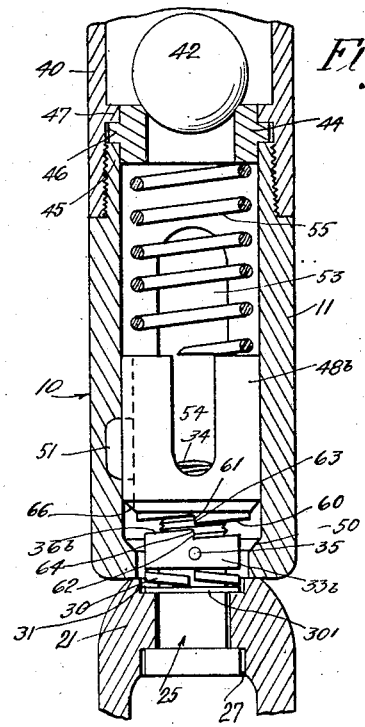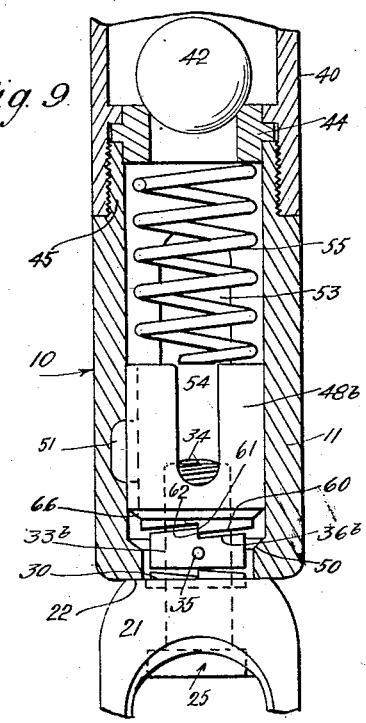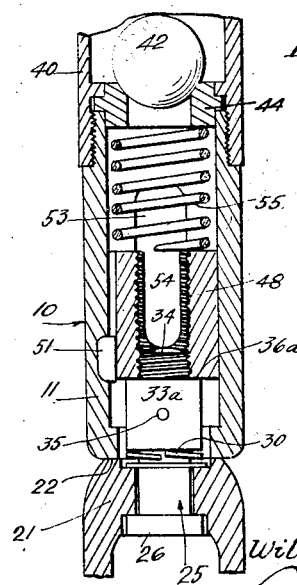

Patented Oct. 11, 1927.

1,644,998

UNITED STATES PATENT OFFICE.

ROBERT W. GUNN AND WILLSIE A. S. THOMPSON, OF LOS ANGELES, CALIFORNIA.

STANDING-VALVE CONNECTION.

Application filed March 13, 1926. Serial No. 94,411.

This invention has to do generally with means for releasably coupling standing valves to plunger elements of deep well pumps whereby such valves may be set and withdrawn through the medium of the sucker rods by which the plungers are suspended and reciprocated.

The device is of the general type wherein the standing valve and plunger element are completely separable (in counter-distinction to the type wherein a Garbutt rod constantly connects them) but have interlocking elements which are adapted to engage when the pump plunger is lowered beyond its working stroke into contact with the standing valve, the locking and unlocking of the elements being accomplished by rotation of the sucker rods, either through manipulation from the top of the well or by cam action occurring between said elements during relative longitudinal movement thereof.

The invention is more particularly concerned with devices of the above mentioned type wherein connection and disconnection of plunger element and standing valve are made through the threadable engagement of a nut on one with a shank on the other.

In our co-pending application on standing valve connection, filed December 1, 1924, Serial No. 753,403, we have shown such a device, the coupling consisting of a threaded shank on top the standing valve and a grip or connecter embodying a sleeve carried at the end of the plunger element and having a nut confined within its bore, the nut being capable of limited longitudinal movement with respect to the sleeve but held against rotation therein.

When setting a valve, the shank is threaded into the nut, and the plunger, with valve thus attached thereto, is lowered by the sucker rods until the valve seats within the shoe at the well bottom. The plunger is then rotated to unscrew the nut from the shank, whereupon the plunger is lifted clear of the valve and into position for pumping actuation. When the valve is to be withdrawn, the plunger is lowered until the nut comes into registering end contact with the shank, whereupon the rods are rotated to screw the nut onto the shank so the rods may subsequently be lifted to pull up the plunger with the standing valve attached thereto. Now it is obviously desirable that the nut and shank be fully threadably engaged before the rods are lifted, yet the operator at the well mouth naturally is unable to tell exactly when the threads of nut and shank take hold and hence when sufficient rotation of the rods has been had to thread the nut just home. To be on the safe side he will ordinarily give the rods more than enough rotation, thereby placing the shank at its juncture with the valve (ordinarily the point of greatest weakness) under severe torsional strains, especially where the valve is sanded into its shoe to such an extent that it strenuously resists rotation. Shanks are very apt to fracture or threads to strip under such strains, with the result that valves become "lost" and must be fished out, usually a long and costly operation.

It is therefore the principal object of this invention to provide a connection having such characteristics that these fractures may be avoided. In general, this is done by providing a friction-tight slip joint connection between one of the connecter or grip members and its carrying element, preferably between the threaded shank and the standing valve. Then, after the nut is threaded home on the shank, subsequent rotation of the nut merely causes rotation of the shank with respect to the standing valve, rather than tending to twist the shank in two or stripping the threads of nut or shank.

A spring is preferably employed for maintaining such frictional contact between the valve and shank that rotation of the shank with respect to the valve is resisted to a sufficient extent to insure that the shank is normally held stationary while the nut is being threaded or unthreaded therefrom.

Other novel features and objects of the invention will be made apparent from the following detailed description, reference being had to the accompanying drawings, in which:

Fig. 3 is an enlarged fragmentary, medial section, partly in elevation, through the connecter when in the position of Fig. 2;

Fig. 4 is a view similar to Fig. 3 but showing the grip sleeve in full threaded engagement with the standing valve shank Fig. 5 is a section on line 5—5 of Fig. 3, showing the ball bumper used in connection with the "blind" valve;

Fig. 6 is a fragmentary section generally similar to Fig. 4 but showing a slight modification in the arrangement of the connecter parts;

Fig. 7 is generally similar to Fig. 3 but shows a modification of the connecter construction;

Fig. 8 is a view of the modification shown in Fig. 7, but showing the grip sleeve in elevation and screwed partially down on the standing valve; and Fig. 9 is a view similar to Fig. 8 but showing the grip sleeve screw fully home.

Figure 1:
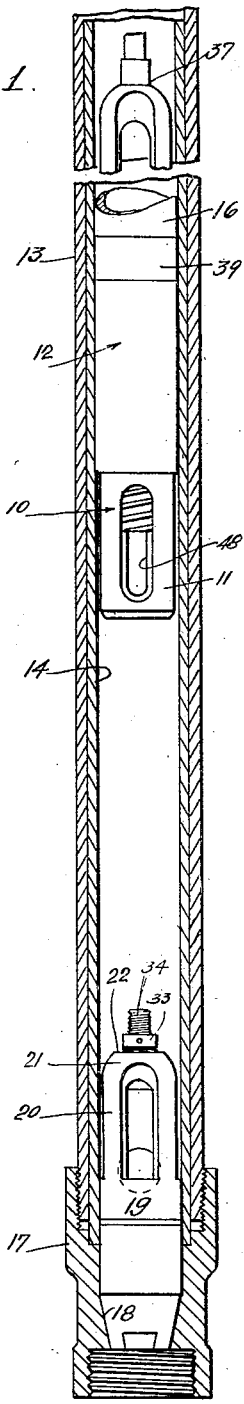
Fig. 1 is a sectional, contracted view of the lower end of a pump barrel, the plunger being shown approximately at the lower limit of the working stroke of the pump.

We have shown our device as applied to a cupless pump plunger, the peripheral face of which is ground to fit the working barrel, but this is merely for the purpose of illustrating one application of the invention and is not to be construed as a limitation thereof. Neither is the showing of a particular type of pump lining, working and standing valve, etc., to be construed as in any way limiting the invention.

As will be hereinafter set forth, the plunger element and standing valve each carry a grip member adapted to engage one another threadably when connection is to be made between element and valve. It is the principal feature of the invention to have one or the other of these gripping members capable of axial rotation with respect to its carrying element after full threaded engagement has been had, such rotation to be in a thread engaging direction, though yieldable means are provided for resisting such rotation so thread engagement and disengagement may be initiated by relative rotation of the members. It is preferable that the valve-carried member be the rotatable one, and we have so shown it, though this is not to be construed as limitative on the invention, considered in its broader aspects.

In the drawings, the numeral 10 generally indicates a "grip" or, as it will hereinafter be referred to, "connecter" which comprises, in part, a cylindrical sleeve 11 adapted to be attached to the plunger element generally indicated at 12. This plunger element is made up of the usual valve cages, bushings, etc., arranged in any operative manner, and the connecter is adapted to be secured to the lowermost member of the element whether it be the plunger proper, working valve or other member. It is of advantage to locate the standing and working valves as close together as possible, thereby reducing the undesirable effect arising from the compression of gas between the two valves. We have therefore illustrated the use of a "bottom" valve for the plunger, and have shown the connecter attached directly thereto, without intending to infer that the connecter is limited to the specific mode of attachment, or to attachment to this particular member of the plunger element.

The working barrel 13 supports pump liners 14 within which the plunger element 10 is adapted to be reciprocated by the usual sucker rods 15, the tubular plunger proper 16 and liners 14 being ground to fit. At the lower extremeties of barrel 13 and liner 14, is the shoe 17 having the usual tapered seat 18 for receiving the tapered extremity of standing valve 19.

The cage 20 of valve 19 has a crown portion or element 21 which presents an upwardly facing and preferably, substantially flat shoulder 22. Extending vertically and with relatively easy fit through a bore 23 in crown 21 is the pin portion 24 of a shank generally indicated at 25 and constituting a "grip member" for the standing valve with which it is coaxial. The pin has a head 26 which is received for rotation in counter bore 27 at the under side of the crown; the upper face 28 of the head being held in frictional contact with the under face 29 of the crown by a split spring washer 30, or its equivalent, which is seated on a wear washer 30' in counter bore 31 at the upper face of the crown and engages the downwardly facing annular shoulder 32 provided on the shank by collar 33. This collar may be screwed down to position over the upwardly extending, threaded extremity 34 of the shank, (though this screw connection between collar and shank is not essential to the invention, considered in its broader aspects) and then secured in any suitable manner, as by pin 35, against rotation with respect to the shank. Head 26 may have sockets 26' to take a spanner wrench whereby the shank may be held or turned when collar 33 is threaded onto the shank. While the shank is capable of axial rotation with respect to the standing valve, spring or washer 30 acts as a brake tending to resist such rotation by virtue of the frictional contact caused thereby between the crown and pin head and between the spring and wear washer or spring and collar, depending upon whether or not the spring rotates with the shank. Collar 33 provides an upwardly facing annular shoulder 36 which is spaced appreciably below the upper end of the shank.

Sucker rods 15 are coupled at 37 to an open crown 38 at the top of plunger proper 16, while a plunger bushing 39 threadably connects the plunger proper to the sleeve or cage 40 of "blind" or enclosed bottom valve 41. The valve ball 42 is confined within sleeve 40 and is limited in its vertical movement by valve seat 44 and the stirrup bumper 43 on bushing 39. Sleeve 11 of connecter 10 has an extension 45 adapted to be threaded into the bore of valve sleeve 40, and valve seat 44 has an annular flange 46 adapted to be clamped between the internal flange 47 of sleeve 40 and the upper extremity of extension 45, whereby the seat is retained in proper position.

Fitting relatively loosely and capable of longitudinal sliding movement within the bore of sleeve 11, is a grip member on nut 48 which is co-axial with sleeve 11 and hence with plunger element 12. The internal, annular sleeve flange 49 presents an upwardly facing shoulder 50 which limits the sliding movement of the nut downwardly when the connecter is clear of the standing valve. Nut 48 is held against any appreciable amount of rotary movement with respect to the sleeve by any of the well known keying or splining methods. We have illustrated one such method in the form of a key 51 carried by and extending inwardly from sleeve 11, and thence projecting into the longitudinally extending slot or way 52 milled in the peripheral face of nut 48.

Sleeve 11 is of slightly less outside diameter than is the plunger element, and slots 53 are provided through the sleeve and preferably extend above nut 48 even when the latter is at the limit of its upward movement. Nut 48 preferably has slots 54 which open at their upper ends to the sleeve bore.

When standing valve 19 is to be set, it is manually rotated to thread shank 25 into nut 48, washer 30 holding the shank against rotation with sufficient force to allow this threaded engagement to be made easily. Preferably, though not necessarily, a spring 55 is interposed between the upper end of nut 48 and the bottom of seat 44 to exert a downward pressure on the nut and thereby aid in initiating threaded engagement between the nut and shank.

Preferably, also, the vertical spacing of collar shoulder 36 and crown shoulder 22 is greater than the vertically measured distance between the lower end of sleeve 11 and sleeve shoulder 50, so when nut 48 is in full threaded engagement with the shank to bring the lower end of the nut down on shoulder 36, flange 49 will not so spread the nut and head 26 that the shank is bindingly held against rotation by the exertion of a reasonable rotative force.

The connecter and standing valve are now in the condition of Fig. 4, and the whole assembly is lowered through the working barrel until the valve seats in shoe 17. During the lowering process, air and fluid beneath the standing valve passes around sleeve 11 and to the interior of the plunger through passageways 53 and 54, the building up of pressure beneath the plunger thereby being prevented.

The valve is pressed home by pressure directed on shoulder 22 of crown 21 by the lower end of sleeve 11, no strain being imposed on the threaded connection between valve and connecter grip by such pressure. By screwing the shank only partially into nut 48, the valve may be hammered or driven home by short strokes of the plunger, the space between the bottom of the nut and flange shoulder 50 providing the necessary lost motion, and the blow being delivered by the end of sleeve 11 on crown shoulder 22. The pitch of the nut and shank threads is preferably such that when the plunger, with valve attached, is moved vertically through the pump tubing there is no danger of the connecter becoming uncoupled from the valve by reason of vibration or other conditions which might tend to unscrew the coupling, even though the shank be not tightly screwed into the nut.

After the valve is firmly seated, it is frictionally retained against rotary movement within the shoe, and plunger 12, and hence connecter 10, is rotated through the medium of the sucker rods in a manner to unscrew nut 48 from shank 25, the nut moving upwardly through the sleeve bore during this period and spring 30 holding the shank against rotation with the nut. As soon as the nut is completely unscrewed from the shank, the plunger is raised to pumping position (Fig. 1) and during subsequent pumping strokes there will exist no co-action between the connecter and standing valve. Fluid flowing into the pump barrel between the standing valve and the plunger during an upstroke of the pump, passes, during the succeeding down stroke of the pump, through the nut bore and valve 41 into the plunger bore. Fluid also passes upwardly about sleeve 11 and through passageways 53 and 54 to the interior of the plunger element. It is evident that the connecter in no way interferes with the proper functioning of the pump, and that slots 53 and 54 insure ample passageways for the inlet of fluid.

In case the plunger strokes too low, for instance, by reason of the sucker rods becoming stretched, the consequent contacting of connecter and standing valve will not damage the nut or shank threads, for the nut immediately comes to rest on top the shank, though sleeve 11 may continue downwardly.

Figure 2:
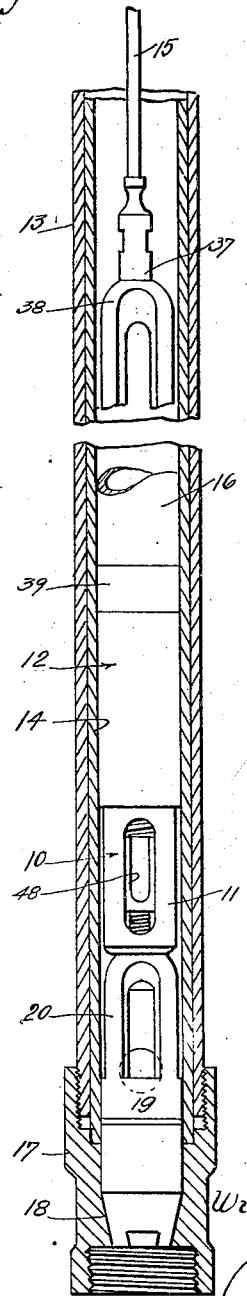
Fig. 2 is a view similar to Fig. 1 but shows the plunger lowered until the grip sleeve is in contact with the standing valve shank.

In case the standing valve is to be "picked up," plunger 12 is lowered to the position of Fig. 2, nut 48 first coming to rest on top shank 25, and sleeve 11 continuing in its downward movement until its lower end bears on standing valve crown shoulder 22. Due to the co-axial arrangement of shank 25, plunger 12, sleeve 11 and nut 48, the threaded bore of the nut registers with shank 25 so, upon subsequent rotation of plunger 12 and connecter 10 through the medium of sucker rods 15, nut 48 is screwed onto shank 25, spring 30 holding the shank against rotation with sufficient force to make this thread connection possible.

Spring 55 urges the nut downwardly to insure engagement with the shank, especially in the event the fluid within the barrel is of such consistency as to retard the longitudinal sliding movement of the nut by gravity. Continued rotation of the connecter draws the nut down into full threaded engagement with the shank and onto collar shoulder 36. Now, were the shank to be non-rotatively connected to the valve, any added rotative force applied to the nut would tend to twist the shank off or to strip the nut or shank threads, that is if the standing valve is "sanded in" or for some other reason resists rotation, with obviously undesirable results. Since it is almost impossible for the operator to tell exactly when the nut is home, and the tendency is to rotate the rods excessively so there will be no doubt that connection is fully made, such failure of the shank due to excessive torsional strains is quite frequent. However, with our device in use, excessive rotation of the nut in a thread-engaging direction merely causes rotation of the shank against the action of spring washer 30. In other words, there is a "slip-joint" connection between connecter and standing valve which holds under normal torsional strains and yields to allow slippage when the torsional strains are excessive.

As soon as connection is made, the valve is lifted bodily along with the plunger.

In order that, even with the nut threaded fully home, there may be ample lost motion between the connecter sleeve and valve to allow the valve to be hammered home by reciprocating the sleeve to contact it repeatedly with the valve crown, or to jar the valve loose from its shoe by reciprocating the sleeve to contact its internal flange sharply and repeatedly with the lower end of the nut, we may fashion the device as shown in Fig. 6. The device as there shown is identical with the device shown in Fig. 3, corresponding parts are therefore numbered similarly, except that collar 33 is so disposed or proportioned in length that shoulder $36^a$ of collar $33^a$ is spaced a considerably greater distance above crown shoulder 22. Hence, when nut 48 is threaded down on shank 25 until its lower end contacts with shoulder $36^a$, there will be a considerable space between sleeve shoulder 50 and the lower end of the nut, allowing an appreciable amount of relative vertical movement between sleeve and nut.

In Figs. 7, 8 and 9 is shown a slightly modified embodiment of the invention and the occasion for providing this modification may be explained as follows: It sometimes happens that the nut is threaded home on the shank with such force that reverse rotation of the nut with respect to the shank (when the connecter is to be uncoupled from the seated standing valve) is resisted to an undesirable degree, the shank tending to revolve with the nut against the action of spring 30. The connecter then will not come free from the standing valve, and the latter will be picked up from its seat when the plunger is lifted to its working position. The pump will then be inoperative and the only remedy is to pull the entire string and make substitutions or changes. With the device constructed in accordance with Figs. 7, 8 and 9, such happenings are prevented by so fashioning the parts that the connecter nut may not be threaded onto the shank in a manner effectively to resist subsequent unscrewing.

All parts of these figures as are similar to corresponding parts in the other figures are given similar numbers. The following changes are made, however. The upwardly facing shoulder $36^b$ of collar $33^b$ and the downwardly facing shoulder 60 of nut $48^b$ are complementarily spiraled, the spirals being of substantially the same lead as that of the screw threads of shank 25 and nut $48^b$. Shoulders 61 and 62, formed between the ends of spiral faces 60 and $36^b$, respectively, extend substantially parallel to the axes of nut and shank.

The spirals of the collar and nut are in such predetermined relation with their threads, and hence with the threads of the common shank that when nut $48^b$ is threaded down to such a point that it is capable of but one more complete revolution before shoulders 61 and 62 engage (see Fig. 8) point 63 of the nut vertically clears point 64 of collar $33^b$ by a slight margin (preferably by considerably less than the lead of the threads and spiral). Shoulders 61 and 62 are necessarily substantially equal in length to the lead of the threads (for the lead of the threads and the spirals are the same, and shoulders 61 and 62 extend substantially perpendicularly from end to end of a single spiral convolution) and therefore when nut $48^b$ is revolved 360° (see Fig. 9) beyond its position as shown in Fig. 8, shoulder 61 will engage shoulder 62 to prevent further rotation of the nut, but the entire extent of face 60 will clear face $36^b$ by a vertical distance equal to the distance by which points 63 and 64 cleared when last passing. Since points 63 and 64 cleared by an amount much less than the lead of the threads, shoulders 61 and 62 overhang each other by an amount only a little less than the thread lead and hence have ample bearing surface and ample backing or stock behind them.

With the collar spiral cut properly for a given installation, it will be seen that the collar may be threaded to any position on the shank before it is pinned and yet the collar and nut spirals will clear when the vertical shoulder engage one another. The advantages of this feature from a manufacturing standpoint will be apparent to those skilled in the art.

Since there is vertical end clearance between the opposed faces of the nut and collar when in the position of Fig. 9, there is no possibility of frictional contact between said faces to cause the nut to stick or resist unscrewing action, and the threads will not bind in the absence of any force tending to wedge the nut threads into engagement with the shank threads, a force which would exist were torsional force to be applied to the nut with faces 60 and 36$^b$ in engagement.

Downwardly facing, annular shoulder 66 of nut 48$^a$, overlies sleeve shoulder 50 but is spaced considerably thereabove when shoulders 61 and 62 are in engagement so the sleeve and nut may be capable of limited relative longitudinal movement whereby the valve may be hammered home or jarred loose as described in connection with Fig. 6.

When shoulders 61 and 62 are in contact (Fig. 9) the nut may be considered as in full threaded engagement with the shank, and subsequent rotation of the nut in a thread-engaging direction serves merely to rotate shank 25 against the action of spring washer 30, to the end mentioned in connection with the same feature as disclosed in the other views.

It will be understood the drawings and description are to be considered merely as illustrative of and not restrictive on the broader claims appended hereto, for various changes in design, structure and arrangement may be made without departing from the spirit and scope of said claims.

We claim:

1. In a device of the character described, a plunger element and a standing valve element, a grip member carried on the plunger element, a grip member carried on the standing valve element, said members being threadably engageable with one another upon relative rotation of the plunger and valve elements, and a slip-joint connection between one of the members and its carrying element adapted to allow relative rotation therebetween in thread engaging directions after the two members are in full threadable engagement.

2. In a device of the character described, a plunger element and a standing valve element, a grip member carried on the plunger element, a grip member carried on the standing valve element, said members being threadably engageable with one another upon relative rotation of the plunger and valve elements, and a friction-tight slip-joint connection between one of the members and its carrying element adapted to allow relative rotation therebetween in thread engaging directions after the two members are in full threadable engagement.

3. In a device of the character described, a plunger element and a standing valve element, a grip member carried on the plunger element, a grip member carried on the standing valve element, said members being threadably engageable with one another upon relative rotation of the plunger and valve elements, a slip joint connection between one of the members and its carrying element adapted to allow relative rotation therebetween in thread engaging directions after the two members are in full threadable engagement, and a spring acting between said one member and its carrying element and adapted yieldingly to resist such rotation.

4. A device of the character described, embodying a plunger element and a standing valve, a coaxial threaded shank on and axially rotatable with respect to the standing valve, yieldable means adapted to resist such rotation, a connecter on the plunger element and comprising a sleeve and a nut which is longitudinally slidable but non-rotative within the sleeve, said nut being adapted to register with the threaded shank when the plunger element is lowered into contact with the standing valve, and being adapted threadably to engage the threaded shank upon subsequent rotation of the plunger element.

5. A device of the character described, embodying a plunger element and a standing valve, a coaxial threaded shank on and axially rotatable with respect to the standing valve, yieldable means adapted to resist such rotation, a connecter on the plunger element and comprising a sleeve and a nut which is longitudinally slidable but non-rotative within the sleeve, said nut being adapted to register with the threaded shank when the plunger element is lowered into contact with the standing valve, spring means acting between the sleeve and nut adapted yieldingly to press the nut into end engagement with the shank when they are so registered, said nut being adapted threadably to engage the threaded shank upon subsequent rotation of the plunger element.

6. In a standing valve, a cage, an upstanding shank on the cage and embodying a headed pin extending vertically and centrally through the crown of the cage and being axially rotatable with respect thereto, the head of the pin being disposed beneath the crown, a collar on the pin and longitudinally spaced from the top of the crown, and a spring about the pin between the crown and collar adapted to hold said pin with its head in frictional engagement with the under face of the crown and thereby effect yieldable resistance to axial rotation of the pin; and threads on the pin above the collar.

7. In a pump, a plunger element, a standing valve, a coaxial threaded shank on and axially rotatable with respect to the valve, yieldable means adapted to resist such rotation, a connecter on the plunger element and embodying a sleeve, a non-rotatable nut mounted for limited longitudinal sliding movement within the sleeve and adapted to engage the shank threadably when the sleeve and valve are relatively rotated, a shoulder on the valve adapted to be engaged by the nut to establish the limit of longitudinal movement of the nut along the shank in one direction, the nut being in full threaded engagement with the shank when at said limit, a second shoulder on the valve adapted to be engaged by the sleeve for limiting sleeve movement in said one direction when said nut and shank are in full threaded engagement, and means adapted to limit longitudinal movement of the sleeve in the opposite direction when the nut and shank are in full threaded engagement; said second shoulder and said means being longitudinally spaced to permit relative longitudinal movement of the sleeve and nut when said nut is in full threaded engagement with the shank.

8. In combination, a plunger element and a standing valve, a coaxial threaded shank and axially rotatable with respect to the standing valve, yieldable means adapted to resist such rotation, a connecter on the plunger element adapted to engage said shank threadably, and means adapted to prevent the connecter from being threaded into binding engagement with the valve and its shank.

9. In a device of the character described, a plunger element and a standing valve element, a grip member carried on the plunger element, a grip member carried on the standing valve element, said members being adapted to be moved into gripping relation with one another by virtue of relative rotation of the plunger and valve elements, and a frictional slip-joint connection between one of the members and its carrying element adapted to allow non-stopped relative rotation therebetween.

10. In a device of the character described, a plunger element and a standing valve element, a grip member carried on the plunger element, a grip member carried on the standing valve element, said members being adapted to be moved into gripping relation with one another by virtue of relative rotation of the plunger and valve elements, a slip-joint connection between one of the members and its carrying element adapted to allow non-stopped relative rotation therebetween, and a spring acting between said one member and its carrying element and adapted yieldingly to resist such rotation.

11. In combination, a plunger element and a standing valve, a coaxial threaded shank and axially rotatable with respect to the standing valve, yieldable means adapted to resist such rotation, a collar threaded down on the shank until its upper face is spaced from the end of the shank, means holding said collar against movement relative to the shank, a connecter on the plunger element and embodying a sleeve, a non-rotatable nut mounted for limited longitudinal sliding movement in the sleeve and adapted to engage the shank threadably when the sleeve and valve are relatively rotated, and a shoulder on the collar adapted to engage the nut to stop movement of said nut longitudinally along the threaded shank before said nut is threaded along the shank a sufficient distance to engage the upper face of the collar with sufficient force to resist reverse rotation of the nut with respect to the shank.

12. In a standing valve, a cage, an upstanding shank on the cage and embodying a headed pin extending vertically and centrally through the crown of the cage and being axially rotatable with respect thereto, the head of the pin being disposed beneath the crown, a collar on the pin and longitudinally spaced from the top of the crown, the upper face of the collar being cut spirally, and a spring about the pin between the crown and collar adapted to hold said pin with its head in frictional engagement with the under face of the crown and thereby effect yieldable resistance to axial rotation of the pin; and threads on the pin above the collar, the lead of the threads and spiral being substantially equal.

In witness that we claim the foregoing we have hereunto subscribed our names this 18th day of Feb., 1926.

ROBERT W. GUNN.
WILLSIE A. S. THOMPSON.